(12) United States Patent
Melot et al.

(10) Patent No.: US 9,589,679 B2
(45) Date of Patent: Mar. 7, 2017

(54) PASSIVE DEVICE REGULATING PRESSURE IN A CHAMBER, CHAMBER AND ASSOCIATED INSTALLATION

(75) Inventors: Vincent Melot, Cordemais (FR); Béranger Errien, Reze (FR)

(73) Assignee: DCNS, Paris (FR)

( * ) Notice: Subject to any disclaimer, the term of this patent is extended or adjusted under 35 U.S.C. 154(b) by 380 days.

(21) Appl. No.: 13/824,567

(22) PCT Filed: Sep. 11, 2012

(86) PCT No.: PCT/EP2012/067693
§ 371 (c)(1),
(2), (4) Date: Aug. 9, 2013

(87) PCT Pub. No.: WO2013/037747
PCT Pub. Date: Mar. 21, 2013

(65) Prior Publication Data
US 2014/0192948 A1 Jul. 10, 2014

(30) Foreign Application Priority Data

Sep. 13, 2011 (FR) ...................... 11 58136

(51) Int. Cl.
*G21C 9/00* (2006.01)
*G21C 1/09* (2006.01)
*G21D 5/00* (2006.01)

(52) U.S. Cl.
CPC ................. *G21C 1/09* (2013.01); *G21D 5/00* (2013.01); *Y02E 30/40* (2013.01)

(58) Field of Classification Search
CPC .......................................................... G21C 1/09
USPC .......................................................... 376/307
See application file for complete search history.

(56) References Cited

U.S. PATENT DOCUMENTS 3,095,012 A 6/1963 McShane
4,124,067 A 11/1978 Bonnet et al.

FOREIGN PATENT DOCUMENTS

FR 2 051 868 A1 4/1971

OTHER PUBLICATIONS

International Search Report for International Application No. PCT/EP2012/067693, dated Jan. 18, 2013.

*Primary Examiner* — Jack W Keith
*Assistant Examiner* — Sharon M Davis
(74) *Attorney, Agent, or Firm* — Knobbe, Martins, Olson & Bear, LLP

(57) ABSTRACT

This device comprises a spray assembly (40) for spraying fluid into the chamber, and a fluid feed pipe (42) intended to feed fluid to the spray assembly (40).
It comprises a fluid-distributing intermediate receptacle (46) positioned between the feed pipe (42) and the spray assembly (40), the intermediate receptacle (46) being connected upstream to the feed pipe (42) and comprising a fluid-evacuating sidewall (52) delimiting through orifices (60) connected to the spray assembly (40).
It comprises at least one pipe (44A to 44D) for evacuating fluid towards the chamber (19) and projecting into the intermediate receptacle (46) opposite the sidewall (52).

11 Claims, 3 Drawing Sheets

Figure 1:
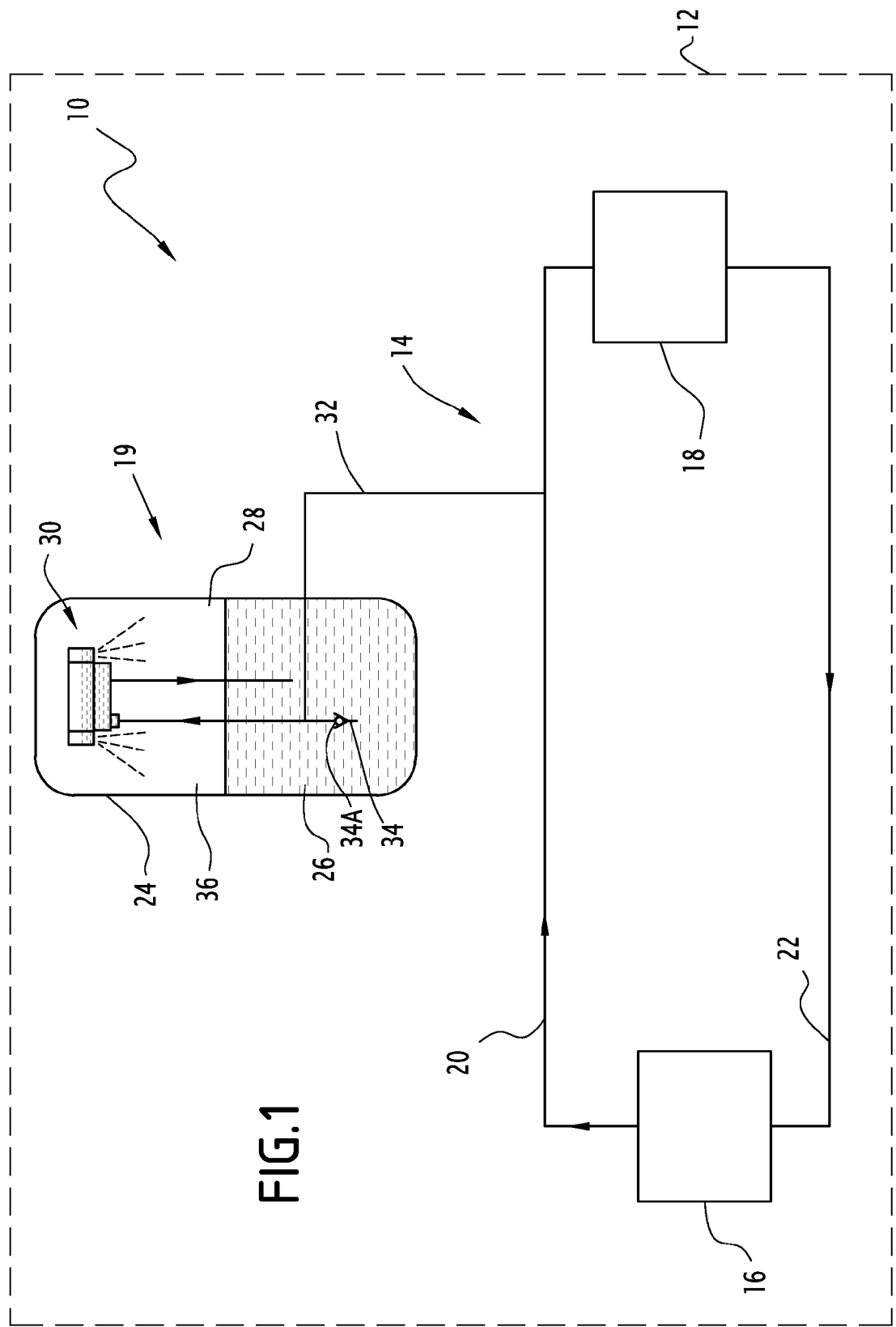

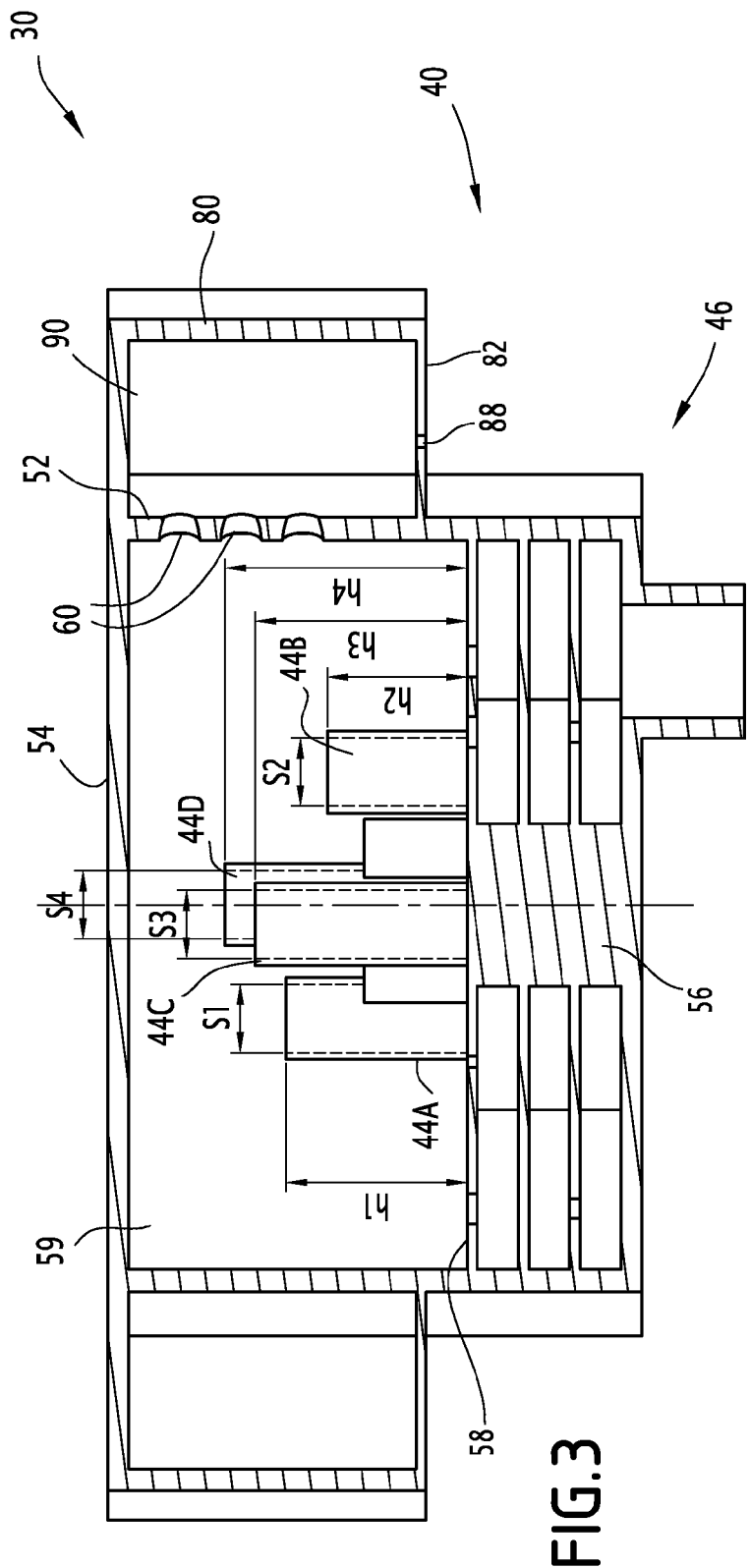
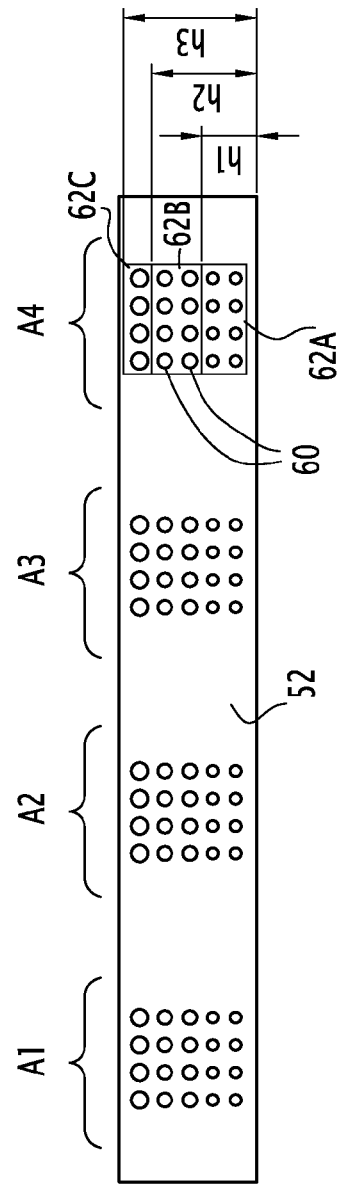
FIG. 3
FIG. 4

PASSIVE DEVICE REGULATING PRESSURE IN A CHAMBER, CHAMBER AND ASSOCIATED INSTALLATION

FIELD OF THE INVENTION

SUMMARY OF THE INVENTION

The present invention concerns a passive device for regulating pressure inside a chamber comprising:
- at least one spray assembly for spraying fluid inside the chamber;
- a fluid feed pipe intended to supply fluid to the spray assembly. The pressurised chamber is a primary circuit pressurizer in a nuclear reactor for example.

The nuclear reactor is in particular a nuclear reactor on-board a submarine such as a nuclear powered attack submarine or a nuclear powered missile launching submarine, or a surface vessel such as an aircraft carrier, icebreaker, container ship. More generally, the nuclear reactor may be a nuclear reactor in a fixed power-producing plant on land or immersed in the sea.

BACKGROUND OF THE INVENTION

In pressurised boiling water nuclear reactors, it is known to regulate the pressure of the primary circuit by means of a regulator assembly comprising a pressurised chamber.

When the density of the fluid circulating in the primary circuit drops significantly, and the fluid increases in volume, it is known from FR 2 051 868 for example to derive part of the pressurised fluid present in the primary circuit off towards a pressurised chamber comprising a volume of pressurised fluid and a gas overhead.

To cause a reduction in pressure, part of the fluid intended to be added to the chamber is taken and sprayed in the form of droplets into the gas overhead of the chamber.

The formation of droplets condenses part of the gas present in the gas overhead, which reduces the pressure of the fluid. Said pressurizer therefore provides efficient pressure regulation.

However, to cause the pressurizer described in FR 2 051 868 to operate, it is necessary to use a regulator comprising driven valves.

In particular, a first valve is used to regulate the quantity of fluid entering the pressurizer and at least one second driven valve is used to regulate the amount of fluid to be sprayed into the gas overhead. The pressure regulating device is therefore complex.

Having regard to the high number of mobile parts involved for regulation, the reliability of the system is thereby weakened. This is particularly critical for nuclear installations on-board submarines.

It is therefore one objective of the invention to provide a pressure regulating device for an installation operating under pressure with which it is possible to obtain regulation reliably and at low cost independently of any movement of the installation.

For this purpose, the subject of the invention is a device of the aforementioned type characterized in that the device comprises:
- an intermediate fluid-distributing receptacle positioned between the feed pipe and the spray assembly, the intermediate receptacle being connected upstream to the feed pipe and comprising a fluid-evacuating sidewall delimiting at least one through orifice connected to the spray assembly; and
- at least one fluid evacuation pipe for evacuating fluid towards the chamber and projecting into the intermediate receptacle opposite the sidewall.

The device of the invention may comprise one or more of the following characteristics taken alone or in any possible technical combination:
- it comprises a plurality of evacuation pipes projecting into the intermediate receptacle, at least two evacuation pipes opening at different heights into the intermediate receptacle;
- at least two evacuation pipes projecting into the intermediate receptacle have different inner cross-sections;
- the or each evacuation pipe is arranged in a central region of the intermediate receptacle, the intermediate receptacle comprising a peripheral region around the central zone into which the feed pipe leads;
- it comprises means for adjusting the height of the or of each evacuation pipe projecting into the receptacle;
- the sidewall delimits a plurality of through orifices distributed over the height thereof;
- the total cross-section of the through orifices located above the or each evacuation pipe on the sidewall is different from the total cross-section of the through orifices located at the height of the evacuation pipe;
- the sidewall delimits a plurality of through orifices distributed angularly around an axis of the intermediate receptacle;
- it comprises a member distributing the fluid from the feed pipe, the distributing member being arranged opposite the feed pipe;
- it comprises a bottom plate closing the sidewall downwardly, the feed pipe opening into the bottom plate or through the bottom plate;
- the fluid spray assembly is arranged outside and around the sidewall, the spray assembly comprising a shower volume, each through orifice connecting the intermediate receptacle with the shower volume;
- the spray assembly comprises a lower wall delimiting a plurality of droplet-forming lumens.

Another subject of the invention is a pressurised chamber, characterized in that it comprises a tank containing a liquid and a gas overhead, the chamber comprising a device such as defined above arranged in the tank, the spray assembly being arranged in the gas overhead of the tank, the evacuation pipes leading into the liquid.

A further subject of the invention is a power-producing installation comprising a source of energy, a heat exchanger and a primary fluid circulation circuit connecting the heat exchanger with the source, characterized in that it comprises a chamber such as defined above connected to the primary circuit.

The installation according to the invention may comprise one or more of the following characteristics taken alone or in any possible technical combination:
- the installation is on-board a submarine.

A further subject of the invention is a method for regulating pressure in a chamber, of the type comprising the following steps:
- providing a device such as defined above;
- bringing a fluid into the intermediate receptacle via the fluid feed pipe;
- distributing the fluid brought into the receptacle to cause a first part of the fluid to pass through the or each through orifice, and a second part of the fluid through the or each evacuation pipe;

receiving the first part of the fluid in the spray assembly, and spraying the fluid in droplet form outside the device;

evacuating the second part of the fluid through the evacuation pipe to lead it into the chamber.

BRIEF DESCRIPTION OF THE DRAWINGS

The invention will be better understood on reading the following description given solely as an example and with reference to the appended drawings in which:

FIG. 1 is a schematic illustration of a first power-producing installation comprising a pressurised chamber provided with a regulating device according to the invention;

FIG. 2 is a partial cross-sectional view of the regulating device according to the invention;

FIG. 3 is a cross-sectional view of the different fluid evacuation pipes present in the device in FIG. 1;

FIG. 4 is a detailed view of an example of outer wall delimiting the intermediate receptacle of the device in FIG. 2.

DETAILED DESCRIPTION OF THE PREFERRED EMBODIMENT

A first power-producing installation 10 according to the invention is illustrated in FIGS. 1 to 4.

This installation 10 is particularly intended to produce power in a submarine 12 such as a military submarine e.g. a nuclear-powered attack submarine or nuclear-powered missile launching submarine. As a variant, the installation 10 is mounted in a surface vessel such as an aircraft carrier, an ice-breaker or container ship.

The installation 10 is particularly intended to provide the power needed to propel the submarine 12 and to power the on-board equipment.

In known manner, the installation 10 comprises a primary circuit 14 for the circulation of a primary fluid, an energy source 16 capable of heating the primary fluid and a heat exchanger 18 capable of exchanging the energy present in the primary fluid with a secondary fluid for the purpose of producing electrical and/or mechanical energy. According to the invention, the installation 10 further comprises a pressurised chamber 19 intended to regulate the pressure of the primary fluid.

The electrical power is produced for example by circulation of the gaseous secondary fluid in a turbine of a generator.

The source 16 is advantageously the core of a nuclear reactor. The core comprises nuclear fuel. It bathes in the circulating primary fluid to heat this fluid.

The primary circuit 14 comprises a hot line 20 connecting an output of the source 16 to convey the primary fluid heated in the source 16 towards the heat exchanger 18, and a cold line 22 intended to collect the cooled primary fluid derived from the heat exchanger 18 to send it back to the source 20. Advantageously, the primary fluid present in the primary circuit 14 is held under pressure so that it is in the liquid state.

As illustrated in FIG. 1, the pressurised chamber 19 comprises a tank 24 containing a pressurised liquid 26, and a gas overhead 28. The chamber 19 has a passive regulating device 30 according to the invention arranged in the tank 24.

The chamber 19 also comprises a pressurised communication pipe 32 between the primary circuit 14 and the regulating device 30 capable of allowing the primary fluid to be led into the device 30 if there is an increase in pressure in the primary circuit 14 and capable of receiving primary fluid from the device 30 if there is a drop in pressure in the primary circuit 14.

The pipe 32 is devoid of any flow rate controlling member downstream of the branch point on the primary circuit 14 and upstream of the regulating device 30.

The pipe 32 is also provided with a tap point 34 to aspirate fluid in the bottom of the tank 24. The tap point is provided with a check valve 34A. It extends upstream of the device 30.

The pipe 32 is tapped on the cold line 22 or hot line 20.

The tank 24 delimits an inner volume 36 containing the liquid primary fluid 26 and the gas overhead 28. The inner volume 36 is larger than 0.5 $m^3$ for example and in particular it is between 2 $m^3$ and 30 $m^3$.

As illustrated in FIG. 1 and FIG. 2, the device 30 comprises an assembly 40 for spraying liquid into the gas overhead, a pipe 42 feeding liquid primary fluid under pressure and a plurality of selective evacuation pipes 44A to 44D evacuating liquid under pressure towards the inner volume 36.

According to the invention, the regulating device 30 also comprises an intermediate receptacle 46 into which the pipes 42, 44A to 44D open, the receptacle 46 being intended to distribute the liquid primary fluid received from the feed pipe automatically between the spray assembly 40 and the evacuation pipes 44A to 44D. It also comprises means 48 for regulating the height of each evacuation pipe 44A to 44D.

As illustrated in FIG. 2, the intermediate receptacle 46 comprises a bottom plate 50, a sidewall 52 communicating with the spray assembly 40 and an upper closure wall 54. It also comprises a central part 56 securing the evacuation pipes 44A to 44D and at least one member 58 distributing the fluid in the receptacle 46.

The plate 50 and the walls 52, 54 delimit a feed volume 59.

The intermediate receptacle 46 is of general cylindrical shape. It extends along a vertical axis A-A' vertically illustrated in FIG. 2.

The central axis A-A' follows the tilt angle of the installation 10 relative to the vertical in particular if the installation 10 is on-board a submarine 12.

The bottom flange 50 closes the sidewall 52 downwardly. It is substantially ring shaped and extends around the central part 56.

The feed pipe 42 is connected upstream to the communication pipe 32.

The feed pipe 42 opens into the bottom plate 50 without passing through it.

The sidewall 52 is of revolution around the axis A-A'. It delimits a plurality of fluid passage orifices 60 towards the spray assembly 40. The orifices 60 pass through the sidewall 52 to connect the feed volume 59 with the spray assembly 40.

In this example and as will be seen below, the orifices 60 are distributed over the height of the sidewall 52, and are distributed angularly around the axis A-A'.

The orifices 60 therefore delimit regions distributed over the height of the sidewall 52 which are respectively located above and below each evacuation pipe 44A to 44D.

In the variant which can be seen in detail in FIG. 4, the regions 62A, 62B, 62C have available fluid evacuation surfaces towards the spray assembly 40 per unit of height which differ from one another.

Therefore, the fluid evacuation surface per unit of height in the lower region 62A is different from the fluid evacuation surface per unit of height in the intermediate region 62B, and is also different from the fluid evacuation surface per unit of height in the upper region 62C.

In addition, the fluid evacuation surface per angular unit in different angular regions A1, A2, A3 of orifices 60 located around the axis A-A' varies from one angular region to another.

As will be seen below, this makes it possible automatically and precisely to adjust the amount of fluid distributed towards the spray assembly 40 in relation to the flow rate of the received fluid and the tilt angle of the installation 10.

The upper wall 54 upwardly shuts off the feed volume 59 at least in part. It extends crosswise relative to the axis A-A'. As seen above, the feed pipe 42 opens into the feed volume 59.

The central part 56 advantageously extends in the bottom plate 50. It delimits a plurality of axial passages receiving the evacuation pipes 44A to 44D. The central part 56 therefore sealingly shuts off the intermediate space between the evacuating pipes 44A to 44D.

The fluid-distributing members 58 extend crosswise in the feed volume 49, advantageously in the bottom plate 50.

In the illustrated example, the receptacle 46 comprises a plurality of members 58 arranged in parallel one above the other. Each distribution member 58 is formed for example by a filter screen 70 delimiting fluid passages 72 positioned facing the feed pipe 42 at the point where it leads into the feed volume 59.

The filter screens 70 extend crosswise opposite the feed pipe 42 to break the jet of fluid coming from the pipe 42 and distribute it uniformly within the feed volume 59 in order to create a volume of liquid having a substantially planar upper surface.

The evacuation pipes 44A to 44D open into the feed volume 59 through the central part 56. They are therefore grouped together in a central region of the feed volume 59, and delimit a peripheral region of greater expanse than the expanse of the central region.

As illustrated in FIG. 3, the pipes 44A to 44D advantageously have different heights and/or inner cross-sections S1 to S3. Therefore as illustrated in FIG. 3, the pipe 44A has a height H1 that is shorter than the height H4 of pipe 44C. The pipe 44C has a height H3 shorter than the height of the pipe 44D. Similarly, the inner cross-sections S1, S2, S3 of the pipes 44A to 44C are different The height H1 projecting into the volume 59 is measured starting from the central part 56 for example, parallel to the axis A-A'.

The heights of the pipes 44A, 44B, 44C are adjusted so that they respectively open at the height of the first region 62A, at the height of the second region 62B, and at the height of the third region 62C of the orifices 60 arranged in the sidewall 52.

Therefore, by adjusting the relative ratio between the respective inner cross-sections S1, S2, S3 and the surface areas per unit of height of the regions 62A, 62B, 62C, the coefficient of fluid distribution between the evacuation pipes 44 and the spray assembly 40 is adjusted automatically. This coefficient of distribution varies as a function of the height of liquid present in the feed volume 59 and of the tilt angle of the liquid present in the feed volume 59.

Figure 2:
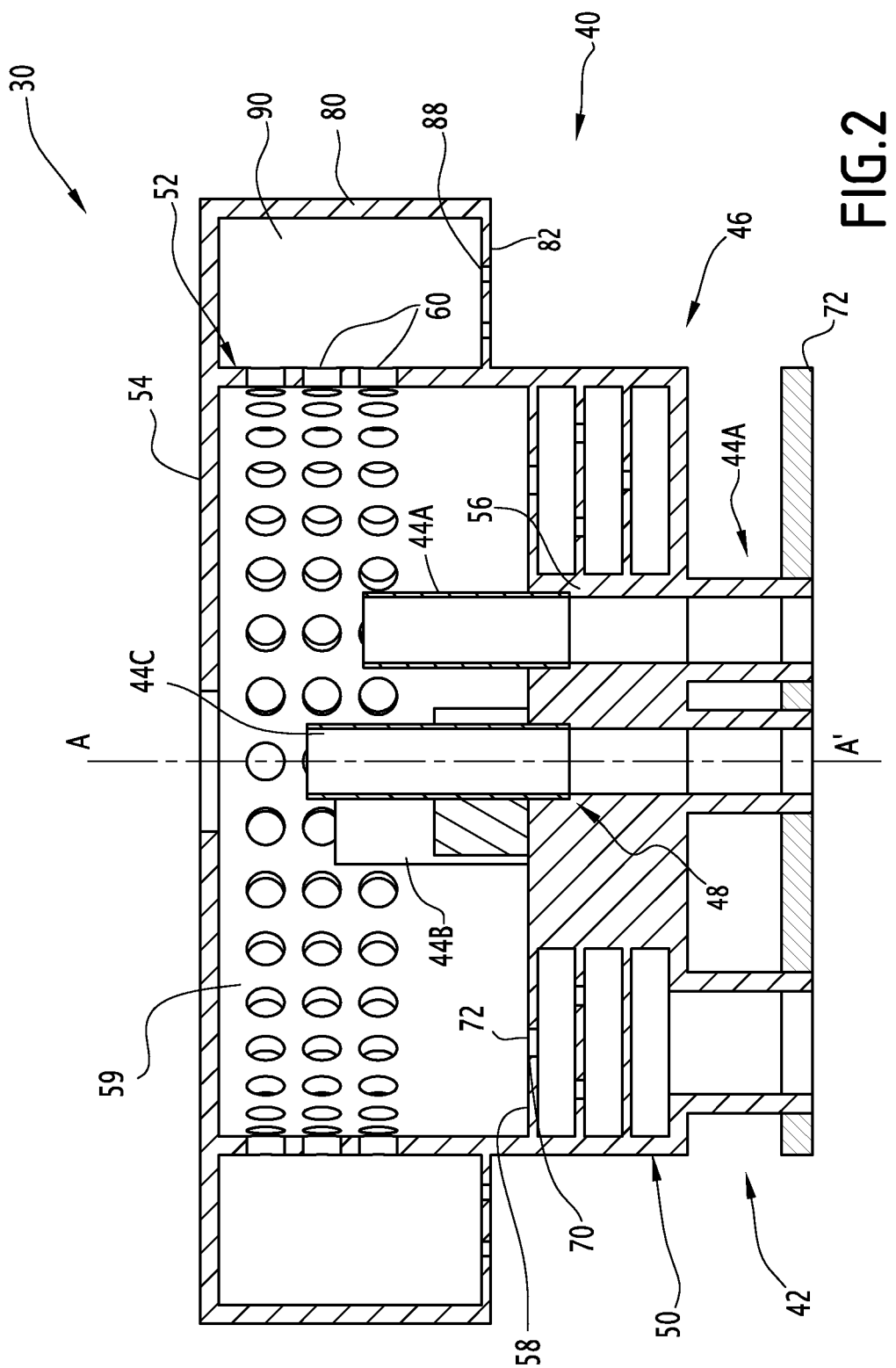

In the example illustrated in FIG. 2, the pipes 44A to 44D are distributed around the axis A-A', so that there exists a first angular sector in which the height of a first group of pipes 44A to 44C is higher than that of a second group of pipes present in a second angular sector.

In combination with the choice of angle densities of orifices 60 in the different angular regions A1, A2, A3, A4 located opposite the groups of pipes, this makes it possible to adjust the coefficient of distribution in relation to the tilt angle of the installation 10, in particular if the installation 10 is installed on board a submarine 12.

The adjustment means 48 are formed for example by a thread made in the central part 56 to allow the adjustment of the projecting height of each evacuation pipe 44A to 44D in the feed volume 49.

As illustrated in FIG. 2, the feed pipe 42 and the evacuation pipes 44A to 44D are advantageously held in position by a flange 72 located underneath the intermediate receptacle 46.

They are respectively connected to the pipes 32, 34.

The spray assembly 40 extends outside the sidewall 52 opposite the orifices 60. It comprises an outer peripheral wall 80, a lower wall 82 for spraying fluid and an upper closure wall 84.

In the example illustrated in FIG. 2, the outer peripheral wall 80 is of similar shape to the sidewall 52. It therefore extends parallel to the sidewall 52 advantageously over the entire height of the sidewall 52.

The walls 52, 80 together delimit a shower volume 90 which in this example is annular.

The lower spray wall 82 extends transversely to the axis A-A', between a lower edge of the peripheral wall 80 and an outer surface of the side wall 52.

The spray wall 82 comprises a plurality of through lumens 88 of smaller size than the size of the orifices 60.

The lumens 88 extend vertically between the shower volume 90 delimited between the walls 80, 52 and 84 and the space located underneath the spray assembly 40 in the tank 24, below the regulating device 30.

Each lumen 88 has a size for example of between 0.1 mm and 2 mm so that, from the liquid primary fluid derived from the orifices 60 and received in the shower volume 90, it creates a plurality of fine droplets which can schematically be seen in FIG. 1. The droplets are intended to condense the gas present in the gas overhead 28 to reduce the pressure in the tank 24.

A description of the functioning of the installation 10 will now be given.

Under normal operating conditions when power is being produced by the installation 10, the source 16 heats the liquid primary fluid in the primary circuit 14. The heated liquid primary fluid is conveyed through the hot line 20 as far as the heat exchanger 18.

When there is a drop in the density of the liquid primary fluid, for example when the power consumed in the submarine 12 decreases, the pressure of the liquid primary fluid increases.

In this case, the liquid primary fluid rises through the communication pipe 32 as far as the feed pipe 42 and enters the regulating device 30.

If the flow rate of the primary feed fluid is high and forms a jet, it comes up against the fluid distribution members 58. The jet is then broken to form a contained volume of liquid primary fluid whose upper surface is substantially planar.

In relation to the height of the liquid primary fluid present in the feed volume 59, the liquid primary fluid successively floods at least one pipe 44A to 44D allowing the evacuation of part of this primary fluid towards the inner volume of the tank 24 through an evacuation pipe 44A to 44D, then through the return pipe 34.

The number of pipes 44A, 44B, 44C flooded by the liquid primary fluid depends on the height of liquid in the feed volume 59.

Also, in relation to the height of liquid present in the feed volume 59 which is a function of the tilt angle of axis A-A' from the vertical 12, the number of orifices 60 placed in contact with the liquid varies.

A determined quantity of liquid primary fluid therefore passes through the orifices 60 to reach the shower volume 90. This determined quantity is fixed by the relative height of the projecting parts of the pipes 44A to 44D, and by the orifice density in the regions 62A to 62C and in the angular regions A1 to A4.

The coefficient of distribution of fluid flow rate between the shower volume 90 and the tank 26 is therefore determined by the design of the device 30 and is directly regulated by the device 30 without any external action and without the presence of any active components.

The flow rate of the fluid evacuated towards the tank 24 is therefore variable and is automatically regulated by the regulating device 30, without any operator action or without actuating a regulator.

The primary fluid in the shower volume 90 is then sprayed in droplet form passing through the lumens 88 arranged in the lower spray wall 82. The droplets thus formed are dispersed in the gas overhead 28. This condenses part of the gas overhead which contributes towards reducing the pressure of the fluid in the tank 24 and subsequently within the primary circuit.

Having regard to the non-presence of any active regulation components, reliable and automatic regulating is obtained. Also the relative quantity of fluid intended for condensation and the relative quantity of fluid intended to be sent to the tank 26 are automatically and selectively regulated in relation to the flow rate of fluid entering the chamber to be pressurised 19 and to the relative tilt angle of the chamber 19.

This reliable regulation is obtained at low cost using a simple mechanical device not having any mobile part.

On the contrary, when the pressure of the liquid primary fluid drops to below its set-point value, pressurised fluid is aspirated from the bottom of the tank 24 through the tap point 34 and valve 34A to be brought into the primary circuit via the communication pipe 32.

In one variant, the installation 10 is fixed to the ground. This installation can be on land or at the bottom of an expanse of water.

In another variant, the installation 10 does not have any nuclear reactor core. It has a non-nuclear fuel energy source 16.

The invention claimed is:

1. A passive pressure regulating device configured to be placed in a pressurized chamber, the passive pressure regulating device comprising:
    at least one spray assembly configured to spray fluid into the chamber;
    a fluid feed pipe configured to feed fluid to the spray assembly;
    an intermediate fluid-distributing receptacle positioned between the fluid feed pipe and the spray assembly, the intermediate fluid-distributing receptacle being connected to the fluid feed pipe and comprising a fluid-evacuating sidewall delimiting at least one through orifice connected to the spray assembly, and
    a plurality of evacuation pipes configured to evacuate fluid towards the chamber, wherein the plurality of evacuation pipes open at one part into said chamber, and open at another part into the intermediate fluid-distributing receptacle, and project into the intermediate fluid-distributing receptacle opposite the sidewall, and
    wherein at least two of the plurality of evacuation pipes open into the intermediate fluid-distributing receptacle at different heights.

2. The device according to claim 1, wherein at least two of the plurality of evacuation pipes have different inner cross-sections.

3. The device according to claim 1, wherein each evacuation pipe is arranged in a central region of the intermediate receptacle, the intermediate receptacle comprising a peripheral region located around the central zone into which the feed pipe leads.

4. The device according to claim 1, comprising at least a filter screen delimiting fluid passages positioned facing the feed pipe.

5. The device according to claim 1, comprising a bottom plate closing the sidewall downwardly, the feed pipe opening into the bottom plate or through the bottom plate.

6. The device according to claim 1, wherein the fluid spray assembly is arranged outside and around the sidewall, the spray assembly comprising a shower volume, each through orifice connecting the intermediate receptacle to the shower volume.

7. The device according to claim 6, wherein the spray assembly comprises a lower wall delimiting a plurality of droplet-forming lumens.

8. A passive pressure regulating device configured to be placed in a pressurized chamber, the passive pressure regulating device comprising:
    at least one spray assembly configured to spray fluid into the chamber;
    a fluid feed pipe configured to feed fluid to the spray assembly;
    an intermediate fluid-distributing receptacle positioned between the fluid feed pipe and the spray assembly, the intermediate fluid-distributing receptacle being connected to the fluid feed pipe and comprising a fluid-evacuating sidewall delimiting at least one through orifice connected to the spray assembly, and
    a plurality of evacuation pipes configured to evacuate fluid towards the chamber, wherein the plurality of evacuation pipes open at one part into said chamber, and open at another part into the intermediate fluid-distributing receptacle, and project into the intermediate fluid-distributing receptacle opposite the sidewall, wherein each evacuation pipe is mounted movable on the receptacle, so that the height of each evacuation pipe projecting into the receptacle is adjustable.

9. A passive pressure regulating device in a pressurized chamber, the passive pressure regulating device comprising:
    at least one spray assembly for spraying fluid into the chamber;
    a fluid feed pipe configured to feed fluid to the spray assembly;
    an intermediate fluid-distributing receptacle positioned between the fluid feed pipe and the spray assembly, the intermediate fluid-distributing receptacle being connected to the fluid feed pipe and comprising a fluid-evacuating sidewall delimiting at least one through orifice connected to the spray assembly, and
    a plurality of evacuation pipes configured to evacuate fluid towards the chamber, wherein the plurality of evacuation pipes open at one part into said chamber, and open at another part into the intermediate fluid-distributing receptacle, and project into the intermediate fluid-distributing receptacle opposite the sidewall, wherein the sidewall delimits a plurality of through orifices distributed over the height thereof.

10. The device according to claim 9, wherein the total cross-section of the through orifices positioned above each evacuation pipe on the sidewall differs from the total cross-section of the through orifices at the height of each evacuation pipe.

11. A passive pressure regulating device in a pressurized chamber, the passive pressure regulating device comprising:
- at least one spray assembly for spraying fluid into the chamber;
- a fluid feed pipe configured to feed fluid to the spray assembly;
- an intermediate fluid-distributing receptacle positioned between the fluid feed pipe and the spray assembly, the intermediate fluid-distributing receptacle being connected to the fluid feed pipe and comprising a fluid-evacuating sidewall delimiting at least one through orifice connected to the spray assembly, and
- a plurality of evacuation pipes configured to evacuate fluid towards the chamber, wherein the plurality of evacuation pipes open at one part into said chamber, and open at another part into the intermediate fluid-distributing receptacle, and project into the intermediate fluid-distributing receptacle opposite the sidewall, wherein the sidewall delimits a plurality of through orifices distributed angularly around an axis of the intermediate receptacle.

* * * * *